United States Patent [19]

Uchida et al.

[11] Patent Number: 5,640,253
[45] Date of Patent: Jun. 17, 1997

[54] IMAGE PROCESSING APPARATUS

[75] Inventors: Yoshiki Uchida, Yokosuka; Shingo Kitamura, Yokohama, both of Japan

[73] Assignee: Canon Kabushiki Kaisha, Tokyo, Japan

[21] Appl. No.: 56,757

[22] Filed: May 4, 1993

[30] Foreign Application Priority Data

May 8, 1992 [JP] Japan .................. 4-115660

[51] Int. Cl.$^6$ .................................. H04N 1/50
[52] U.S. Cl. ................ 358/501; 358/401; 358/468; 399/366
[58] Field of Search .................. 358/438, 402, 358/530, 440, 501, 401, 468, 524, 444; 355/201

[56] References Cited

U.S. PATENT DOCUMENTS

| | | | |
|---|---|---|---|
| 4,739,377 | 4/1988 | Allen | 355/133 |
| 4,739,397 | 4/1988 | Hayashi | 358/530 |
| 4,910,765 | 3/1990 | Matsuse et al. | 379/100 |
| 5,241,403 | 8/1993 | Ishikawa | 358/440 |
| 5,257,119 | 10/1993 | Funada | 358/438 |

FOREIGN PATENT DOCUMENTS 342060 11/1989 European Pat. Off. ....... G03G 15/01

*Primary Examiner*—Scott A. Rogers
*Attorney, Agent, or Firm*—Fitzpatrick, Cella, Harper & Scinto

[57] ABSTRACT

Color image data is stored while being added with an attribute associated with a copy limit of image data in correspondence with a type or level of secrecy to be maintained (e.g., allowing only a specific person to make a full color copy, or to make any copy, of a particular image, or allowing only monochrome copies to be made of a specific image regardless of who is making the copy, etc.) When the color image data is output, an output mode is selected according to the designated type of secrecy to execute image processing and an image output operation, thereby maintaining the desired degree of secrecy of the color image.

31 Claims, 12 Drawing Sheets

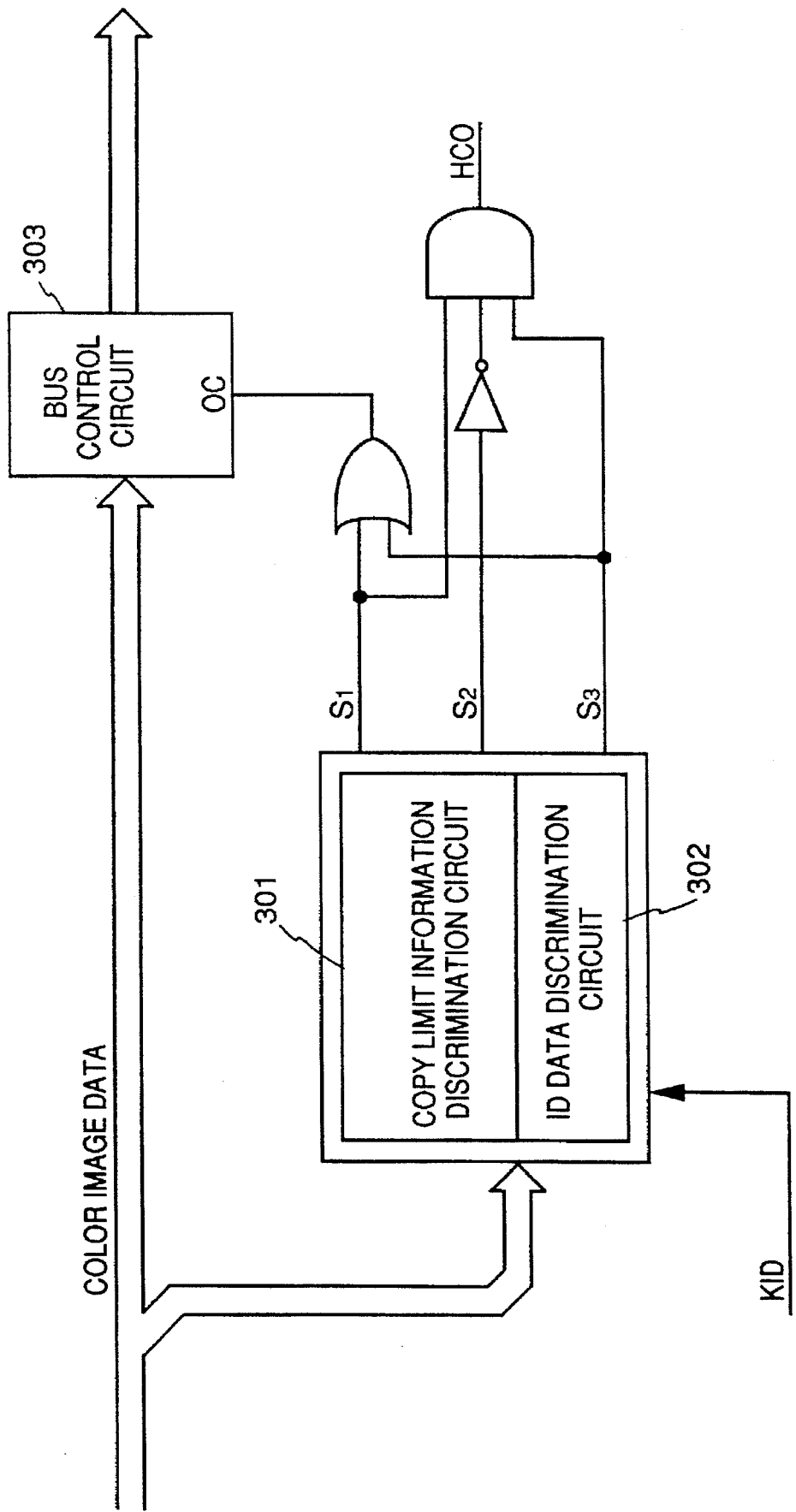

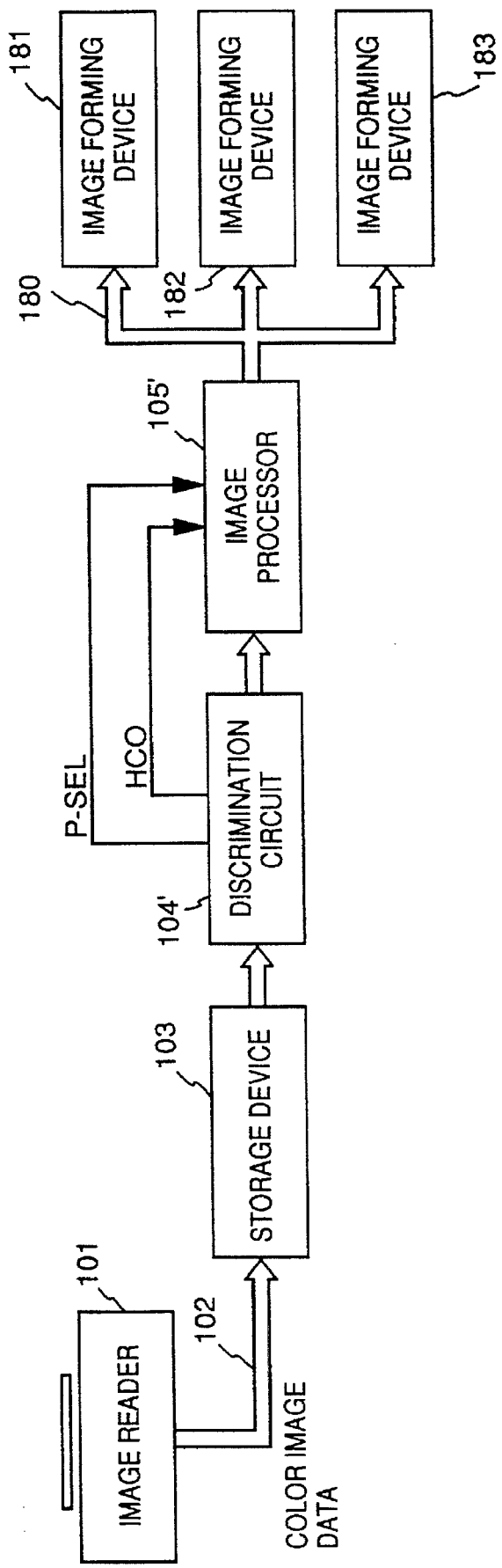

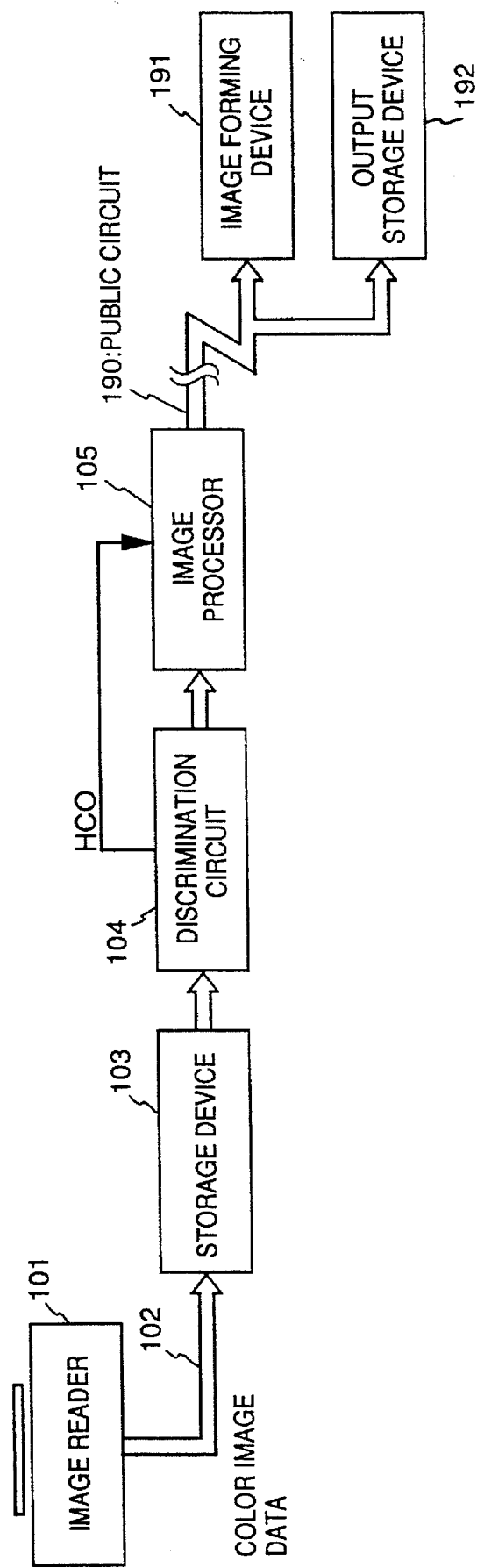

FIG. 10A

| COPY LIMIT / DISCRIMINATION INFORMATION | NO COPY LIMIT | COLOR HARD COPY PROHIBITION | COPY COMPLETE PROHIBITION |
|---|---|---|---|
| ID DATA AGREE | COLOR OUTPUT | COLOR OUTPUT | OUTPUT PROHIBITION |
| ID DATA DISAGREE | MONOCHROME OUTPUT | MONOCHROME OUTPUT | OUTPUT PROHIBITION |

FIG. 10B

| COPY LIMIT / DISCRIMINATION INFORMATION | NO COPY LIMIT | COLOR HARD COPY PROHIBITION | COPY COMPLETE PROHIBITION |
|---|---|---|---|
| ID DATA AGREE | COLOR OUTPUT | MONOCHROME OUTPUT | MONOCHROME OUTPUT |
| ID DATA DISAGREE | MONOCHROME OUTPUT | MONOCHROME OUTPUT | OUTPUT PROHIBITION |

FIG. 10C

| COPY LIMIT / DISCRIMINATION INFORMATION | NO COPY LIMIT | COLOR HARD COPY PROHIBITION | COPY COMPLETE PROHIBITION |
|---|---|---|---|
| ID DATA AGREE | COLOR OUTPUT | COLOR OUTPUT | COLOR OUTPUT |
| ID DATA DISAGREE | COLOR OUTPUT | MONOCHROME OUTPUT | OUTPUT PROHIBITION |

IMAGE PROCESSING APPARATUS

BACKGROUND OF THE INVENTION

The present invention relates to an image processing apparatus and, more specifically, to an image processing apparatus for processing a color image having secrecy or confidentiality.

In order to provide copy limit information to image data output from an image reader, the following method is normally adopted. That is, read prohibition information is added to image data when the image data is stored, and read access to the image data is limited unless a read enable condition presented by the read prohibition information is satisfied, thereby prohibiting the image data from being copied.

When an objective image is character information or a binary image, since only limited methods are available to output it, the conventional method is effective. However, in recent years, the mainstream of image data processing involve color image data having a large information volume, and there are various kinds of secret information. For this reason, the above-mentioned method is insufficient. For example, in the case of a color image whose color information (but not necessarily luminance information) it is desired to keep highly secret. Copying of the color image itself need not be completely prohibited. When copying of the color image itself is completely prohibited, availability and usefulness of the color image data are undesirably limited.

SUMMARY OF THE INVENTION

It is an object of the present invention to provide an image processing apparatus which executes image processing and copying of image data without deterioration of image data, other than color information, in color image data.

In order to achieve the above-mentioned object, according to the present invention, there is provided an image processing apparatus comprising means for inputting predetermined identification information, means for inputting attribute information for limiting outputting of image data, storage means for storing input image data, the identification information, and the attribute information in correspondence with each other, means for comparing newly input identification information with the identification information stored in the storage means, and data output means for controlling the outputting of the image data according to a comparison result and the attribute information.

According to the present invention, there is also provided an image processing apparatus comprising a plurality of image copying means for copying input image data, means for inputting identification information for identifying the plurality of image copying means, selection means for selecting one of a plurality of pieces of attribute information prepared in advance and associated with a copy limit relating to the image data, storage means for storing input image data, the identification information, and the attribute information in correspondence with each other, means for comparing newly input identification information with the identification information stored in the storage means, and data output means for controlling the outputting of the image data from each of the plurality of image copying means according to a comparison result and the attribute information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 5A to 5C are block diagrams showing an arrangement of three kinds of discrimination circuits according to the first embodiment;

FIG. 8 is a block diagram showing an arrangement of main part of a color copying machine according to the second embodiment of the present invention;

FIG. 9 is a block diagram showing a schematic arrangement of a copying system according to the third embodiment of the present invention; and FIGS. 10A to 10C are tables showing a relationship between each of discrimination information and copy limitation and an image output of circuits of FIGS. 5A to 5C.

DETAILED DESCRIPTION OF THE PREFERRED EMBODIMENTS

The preferred embodiments of the present invention will be described in detail hereinafter with reference to the accompanying drawings.

The embodiments to be described below will exemplify a color copying machine as an embodiment of the present invention. However, the present invention is not limited to this, but may be applied to various other apparatuses, as a matter of course.

First Embodiment

Figure 1:
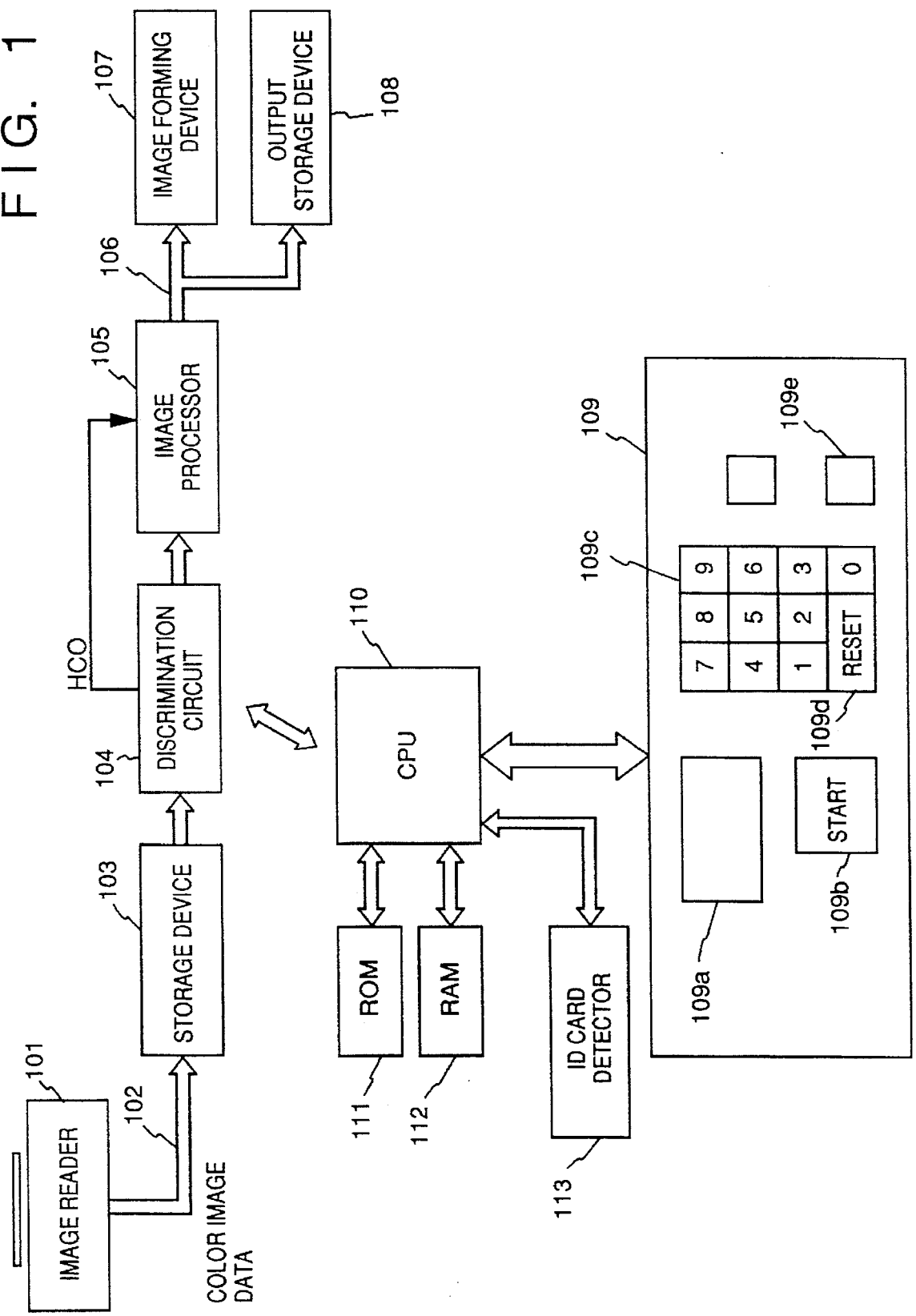
FIG. 1 is a block diagram showing an arrangement of a color copying machine according to the first embodiment of the present invention.

FIG. 1 is a block diagram showing an arrangement of a color copying machine according to the first embodiment of the present invention.

In FIG. 1, reference numeral 101 denotes a color image reader (to be referred to as an "image reader" hereinafter) for converting a color image on an original into an electrical signal (color image data); 102, a transfer path used for transferring color image data obtained by the image reader 101 to a storage device 103; 103, a storage device for storing the input color image data; 104, a discrimination circuit for selecting an image output mode; 105, an image processor for executing image processing according to a signal from the discrimination circuit 104; 106, an interface connecting the image processor 105, an image forming device 107, and an output storage device 108; 107, an image forming device comprising a color image printer; and 108, an output storage device.

Reference numeral 109 denotes an operation unit comprising a display unit 109a, a start key 109b, a ten-key pad 109c, a reset key 109d, a copy prohibition switch 109e for completely prohibiting a copy operation, and the like. Reference numeral 110 denotes a CPU for controlling the entire machine; 111, a ROM storing various programs for operating the CPU 110; 112, a RAM used as a work area of the various programs; and 113, an ID card detector for detecting an identification signal (to be referred to as "ID data" hereinafter) representing the owner of an image.

Description of Image Reader 101

Figure 4:
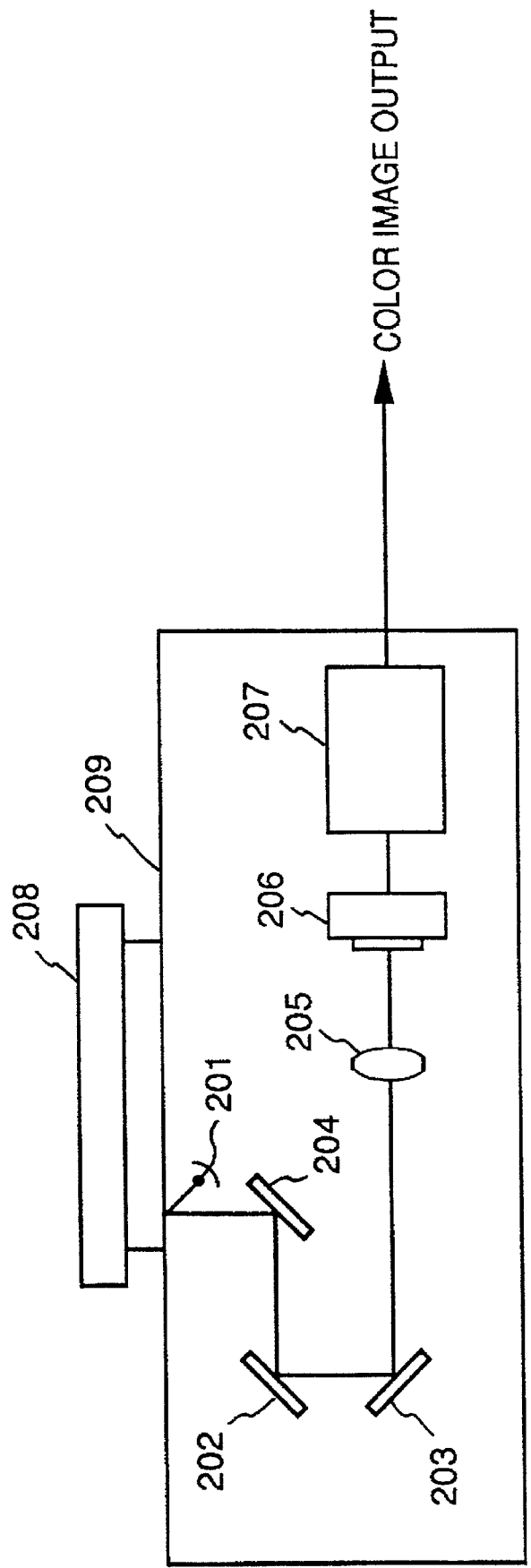
FIG. 4 is a side sectional view showing a schematic arrangement of an image reader according to the first embodiment.

FIG. 4 is a side sectional view showing a schematic arrangement of the image reader 101 according to the first embodiment.

An optical system in the image reader 101 is constituted by an original illumination lamp 201, a first mirror 204, a second mirror 202, a third mirror 203, an imaging lens 205, a CCD line sensor 206 having R, G, and B filters, an original table glass 209, and an original table glass cover 208. The lamp 201 and the mirror 204 scan an original on the original table glass 209 at a speed twice that of the mirrors 202 and 203.

A color image on an original placed on the original table glass 209 is irradiated with light emitted from the lamp 201. Light reflected by the color image is guided by the mirrors 204, 202, and 203, and forms an image on the CCD line sensor 206 via the lens 205. Then, the sensor 206 supplies blue (B), green (G), and red (R) components of full-color information to an image processing circuit 207. The color image on the entire surface of the original is read by an electrical scan (main scan) of the CCD line sensor 206, and a mechanical scan (sub-scan) of the lamp and the mirror.

Thereafter, the image processing circuit 207 converts an optical signal into an electrical signal, and executes image processing such as A/D conversion of the electrical signal, thereby generating color image data.

Description of Discrimination Circuit 104

Figure 5A:
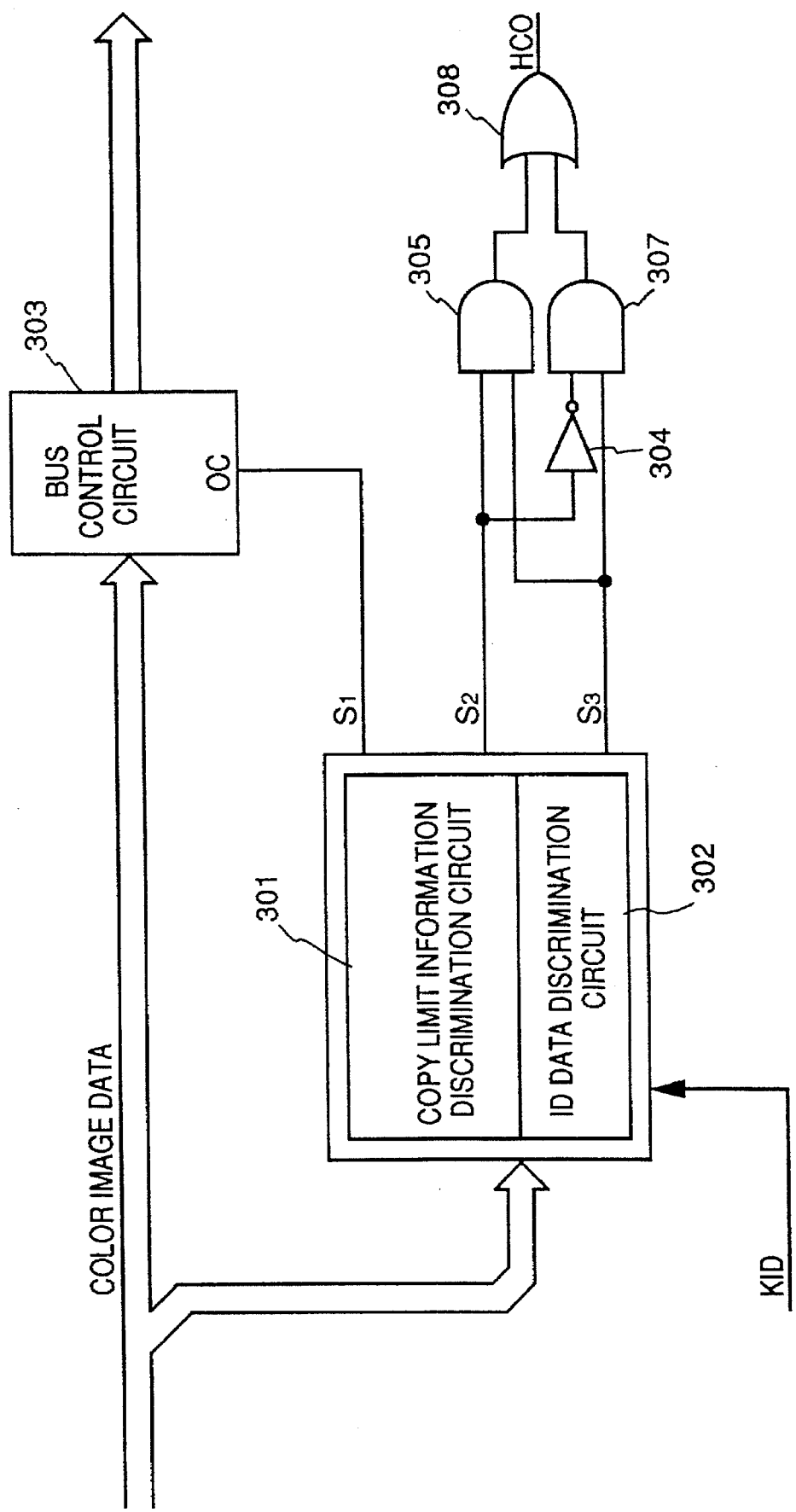
Figure 5C:
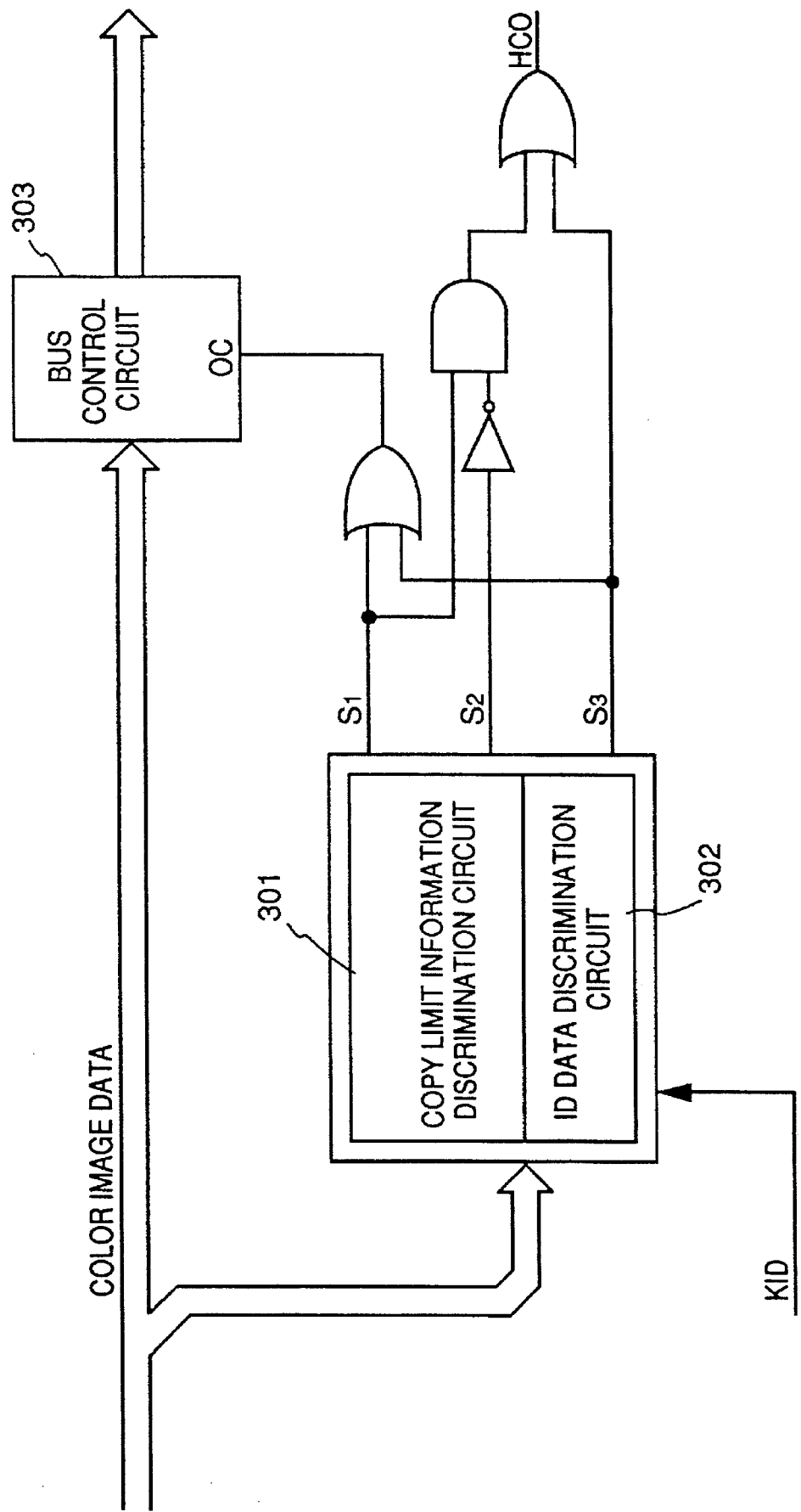

FIGS. 5A to 5C are block diagrams showing an arrangement of the discrimination circuit 104 according to the first embodiment. Note that, in FIGS. 5A to 5C, components with the same numerals have the same operation.

The discrimination circuit 104 includes a copy limit information discrimination circuit 301, an ID data discrimination circuit 302, and a bus control circuit 303 as main components.

FIG. 5A is a first embodiment of the discrimination circuit. The copy limit information discrimination circuit 301 outputs attribute discrimination signals S1, S2 in accordance with an attribute associated with a copy limit added to color image data sent from the storage device 103. If the circuit 301 determines that no copy limit information is present, it outputs signals of (S1,S2)=(1,0). If the circuit 301 determines that a color hard copy is prohibited, it outputs signals of (S1,S2)=(1,1). Furthermore, if the circuit 301 determines that copying is completely prohibited, it outputs signals of (S1,S2)=(0,0). These attribute discrimination signals together with ID codes which will be described below determine an output state of the machine.

The ID data discrimination circuit 302 outputs an ID agreement signal (S3) when ID data added to color image data coincides with ID data (this may be termed "known ID", or KID) input from the operation unit 109 in an image output operation.

The attribute discrimination signal S2 and the ID agreement signal S3 are supplied to an OR gate 308 via AND gates 305 and 307 and a NOT gate 304. Thus, even when a color hard copy operation is prohibited, if two ID data coincide with each other, a color copy enable signal (hard copy, or HCO) is generated.

The bus control circuit 303 outputs color image data to the image processor 105 only when it receives the attribute discrimination signal S1.

It is therefore impossible for those who are not the owner of an image to make a copy of a color image; however, if copying is not completely prohibited, a monochrome hard copy can be made. This does not limit versatility of the copy operation.

FIG. 5B is a second embodiment of the discrimination circuit in which the owner of an image can make a monochrome hard copy, even a copy operation is completely prohibited.

The circuit described in FIG. 5B performs the same operation as the circuit of FIG. 5A, the first embodiment of the circuit, with respect to the operation that color image date, discrimination information and attribute information are separated. Copy limit information and ID data are also discriminated in the circuit.

In this embodiment, color image data are output if there is no limitation on copying and it is the owner of the image who performs the operation. If the owner performs the operation under a limitation copying, or if the operation is performed by someone who is not the owner of the image in a case where copying is not completely prohibited, then a monochrome copy is made.

On the other hand, copying is prohibited if it is performed by someone who is not the owner of an image and a copy operation is completely prohibited.

FIG. 5C is a third embodiment of the discrimination circuit in which the owner of an image can always make a color copy of the color image, while for those who are not the owner, three kinds of copy operation such as color copying, monochrome copying and an operation with a complete prohibition on copying can be performed.

FIGS. 10A to 10C are tables showing output states of the circuits described in FIGS. 5A to 5c, which are determined by ID data obtained by discrimination information and a copy limitation by attribute information.

Note that FIGS. 10A to 10C correspond to FIGS. 5A to 5C respectively.

Description of Image Processor 105

Figure 6:
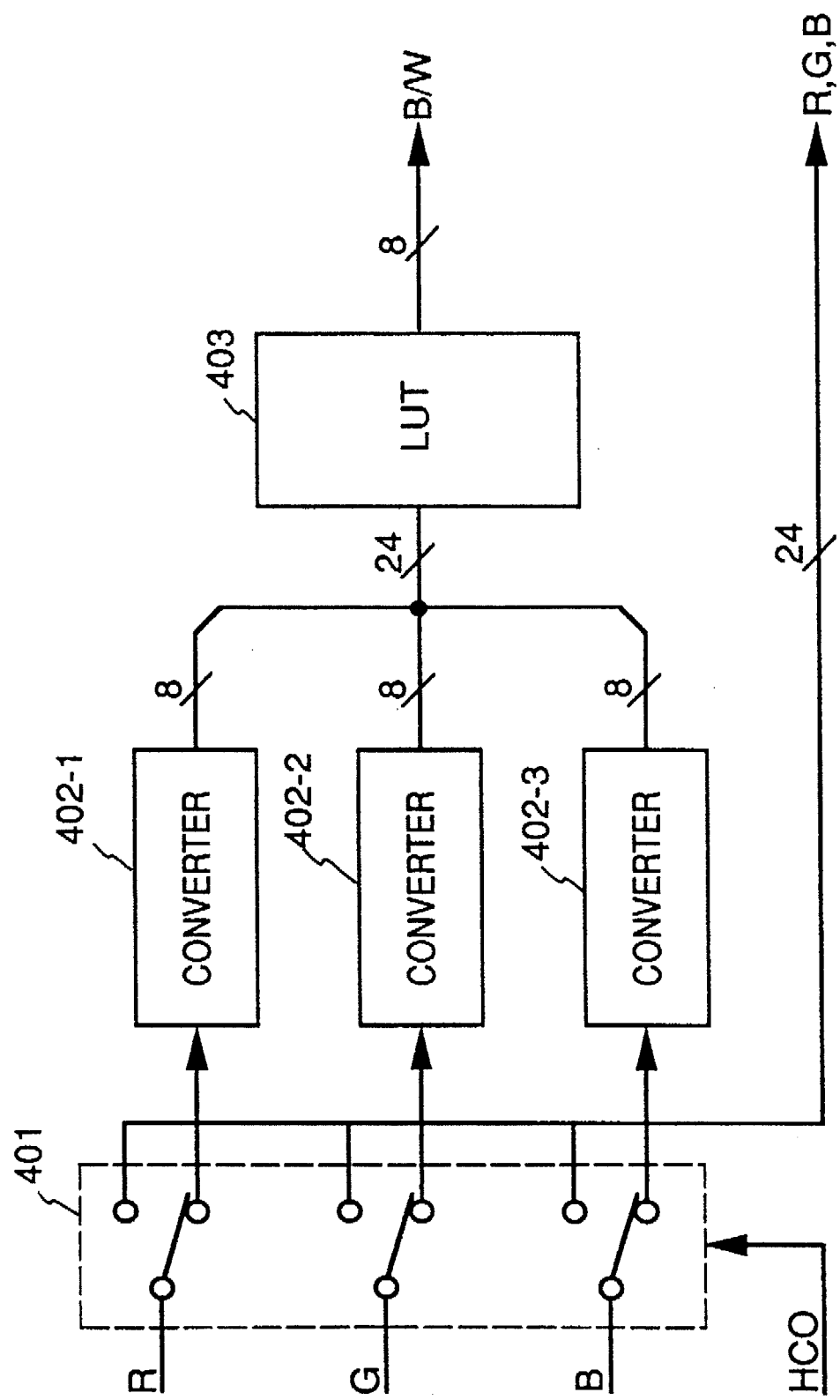
FIG. 6 is a block diagram showing an arrangement of an image processor according to the first embodiment.

FIG. 6 is a block diagram showing an arrangement of the image processor 105 according to the first embodiment. In FIG. 6, reference numeral 401 denotes a contactless switch; 402-1, 402-2, and 402-3, converters; and 403, a look-up table (to be referred to as an "LUT" hereinafter).

The operation of the image processor 105 with the above arrangement will be described below.

When the image processor 105 receives data without receiving any HCO signal, it converts R, G, and B data into B/W monochrome data, and outputs the monochrome data.

More specifically, when the image processor 105 receives data without receiving any HCO signal, R, G, and B signals are supplied to the converters 402-1 to 402-3 upon switching of the contactless switch 401, and are converted into density data. Thereafter, the density data are supplied to the LUT 403.

The LUT 403 has an 8-bit address for each of R, G, and B data, and each address stores a conversion value for executing conversion given by the following equation (1):

$$B/W=(R+G+B)/3 \quad (1)$$

An image output from the LUT 403 according to equation (1) is converted into a monochrome image.

On the other hand, when the image processor 105 receives the HCO signal from the discrimination circuit, color image signals pass through the contactless switches 401, and are output as color image signals.

Description of Image Forming Device 107

Figure 7:
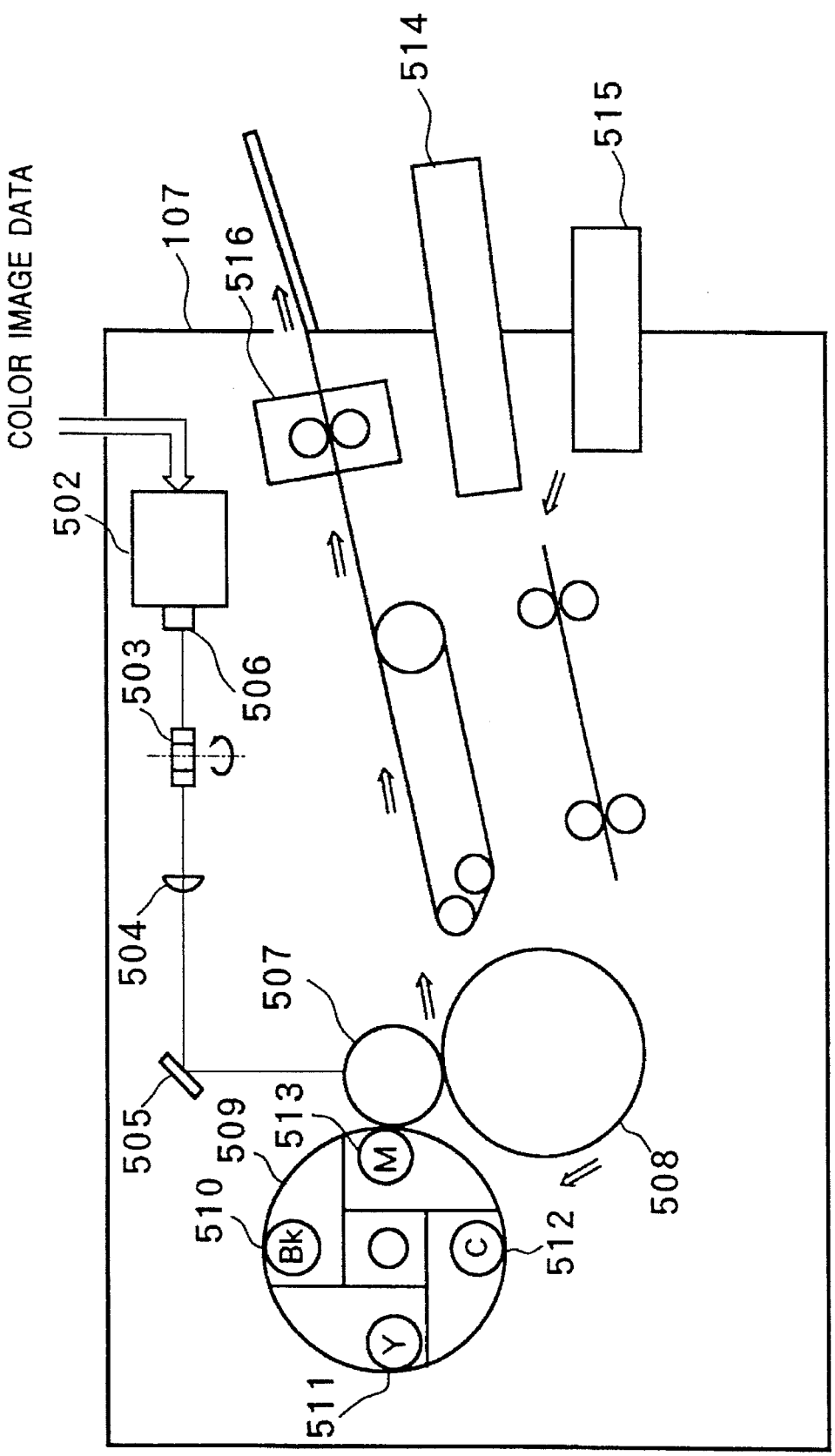
FIG. 7 is a side sectional view showing an internal arrangement of an image forming device according to the first embodiment.

FIG. 7 is a side sectional view showing a schematic internal arrangement of the image forming device 107 according to the first embodiment.

In FIG. 7, reference numeral 502 denotes a laser driver; 503, a polygonal mirror; 504, an f-θ lens; 505, a mirror; 506, a semiconductor laser; 507, a photosensitive drum; 508, a transfer drum; 509, a rotary developing unit; 510, a black developing section; 511, a yellow developing section; 512, a cyan developing section; 513, a magenta developing section; 514 and 515, paper cassettes; and 516, a fixing unit.

The operation of the image forming device 107 with the above arrangement will be described below.

A color image signal is color-separated into magenta (M), cyan (C), yellow (Y), and black (Bk) components, and these color component signals are supplied to the laser driver 502. The laser driver 502 modulates the semiconductor laser 506 according to the input image signals. A laser beam scans on the photosensitive drum 507 via the polygonal mirror 503, the f-θ lens 504, and the mirror 505.

The rotary developing unit 509 is constituted by the magenta developing section 513, the cyan developing section 512, the yellow developing section 511, and the black developing section 510, and these four developing sections are alternately brought into contact with the photosensitive drum 507 to develop an electrostatic latent image formed on the photosensitive drum 507 with a corresponding toner.

A paper sheet fed from the paper cassette 515 or 514 is wound around the transfer drum 508, and the toner image on the photosensitive drum 507 is transferred onto the paper sheet.

After the four color images, i.e., M, C, Y, and Bk images are sequentially transferred onto the paper sheet via the above-mentioned process, the paper sheet passes through the fixing unit 516 to fix the toner images thereon. Thereafter, the paper sheet is exhausted.

Description of Color Image Storage and Recording Operations

Figure 2:
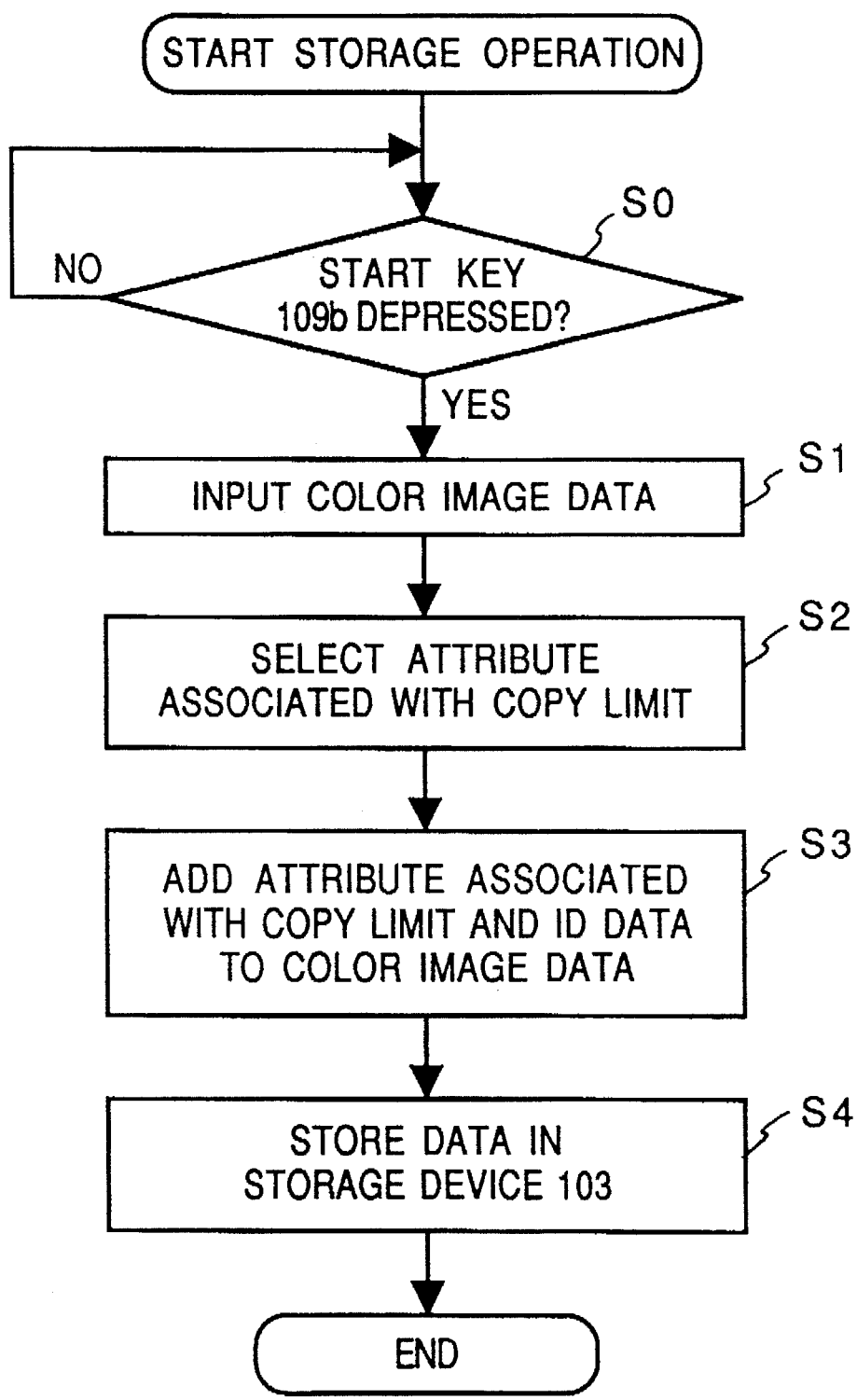
FIG. 2 is a flow chart showing a color image storage operation in an image processing apparatus according to the first embodiment.
Figure 3:
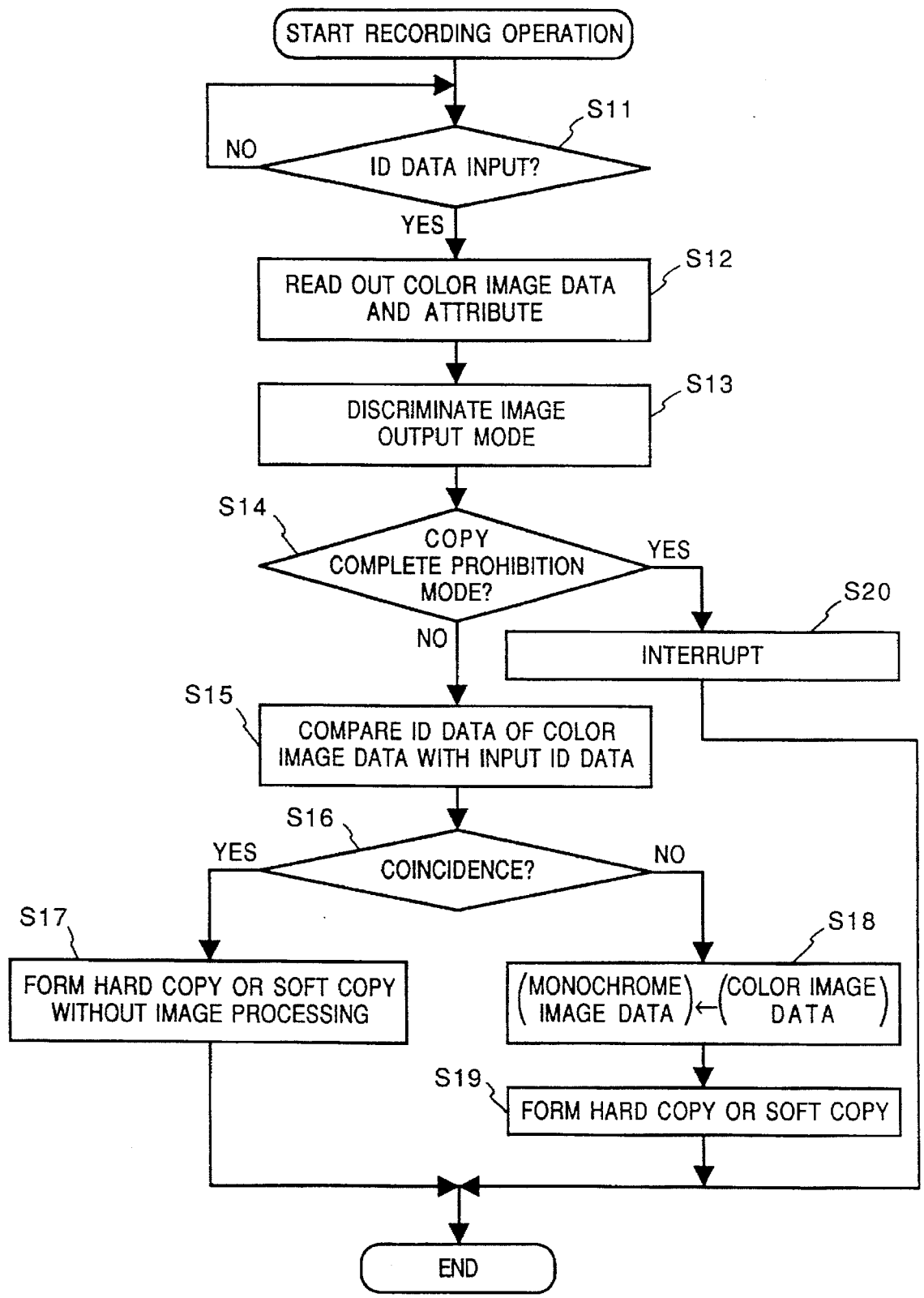
FIG. 3 is a flow chart showing a color image recording operation in the image processing apparatus according to the first embodiment.

FIG. 2 is a flow chart for explaining a color image storage operation according to the first embodiment, and FIG. 3 is a flow chart for explaining a color image recording operation according to the first embodiment.

The color image storage operation will be described below with reference to FIG. 2.

When the start key 109b is depressed (step S0), a color image on an original is read by the color image reader 101, and is converted into color image data (step S1). In this case, when an operator wants to limit copying of an objective color image, he or she selectively depresses keys of the operation unit 109 on the image reader 101 (step S2), so that a color copy limit signal or a copy complete prohibition signal is added to the color image data together with ID data representing the owner of the image (step S3).

The color image data added with an attribute associated with the copy limit is stored in the storage device 103 together with the attribute associated with the copy limit via the transfer path 102 (step S4).

A recording operation based on the stored color image using a discrimination result provided by the discrimination circuit 104 of FIG. 5A will be described below with reference to FIG. 3. Note that as a method of generating ID data used for recognizing the owner of an image, a method of having a name, a code number, or the like by input an operator himself or herself using keys such as the ten-key pad 109c, a method using an ID card, and the like are available.

When color image data stored in the storage device 103 is to be output, an operator inputs ID data (step S11). In response to this input, color image data and the attribute associated with the copy limit are read out from the storage device 103 (step S12), and are input to the image output mode discrimination circuit 104. The discrimination circuit 104 discriminates the attribute associated with the copy limit of the color image (step S13) to select one of image output modes, i.e., a "copy complete prohibition mode", a "color copy prohibition mode", and a "color image copy enable mode".

If the discrimination circuit 104 determines that the copy complete prohibition mode is selected (step S14), processing associated with the copy operation is interrupted, and no image is copied (step S20).

If it is determined in step S14 that the copy complete prohibition mode is not selected, the ID data added to the color image data is compared with the ID data input in step S11 (step S15). If these two ID data coincide with each other (YES in step S16), the color copy enable signal (HCO) is generated, and is output to the image processor 105. In this case, the image processor 105 does not execute any image processing for color image data stored in the storage device 103, and outputs the stored color image data to the image forming device 107 to form a hard copy or to the output storage device 108 to form a soft copy via the interface 106 (step S17).

However, if it is determined in step S16 that the two ID data do not coincide with each other, the color image data is converted into monochrome image data by the image processor 105 (step S18), and the monochrome image data is output to the image forming device 107 to form a hard copy or to the output storage device 108 to form a soft copy via the interface 106 (step S19).

As described above, according to the first embodiment, when a color image is recorded, a color image added with a type or level of secrecy to be maintained is stored. When the stored color image is output, an image output mode according to the type of secrecy command added to the color image is selected, and an image output operation is performed. Thus, secrecy with respect to a color image can be guaranteed, and versatility with which an image can be used, can be increased.

Second Embodiment

In the first embodiment, the owner of a color image is recognized, and a copy limit attribute for persons other than the owner of the color image is determined. However, the present invention is not limited to this. Like in the second embodiment to be described below, by storing in advance discrimination information, attribute information and information which limits image forming devices, corresponding to image data, for each of the plurality of image forming devices, a copy limit attribute may be determined and outputted for each of the plurality of image forming devices.

FIG. 8 is a block diagram showing an arrangement of main part of a copying machine according to the second embodiment of the present invention.

A copying machine according to the second embodiment has an arrangement wherein three image forming devices 181 to 183 are connected to an image processor 105' via an interface 180, as shown in FIG. 8.

A discrimination circuit 104' generates a signal P-SEL for determining an output and an output device in accordance with discrimination information, attribute information and information which limits image forming devices. An image processor 105' selects the image forming device when the processor receives the signal P-SEL.

Note that a copy limit attribute may be determined for each of a plurality of image readers by storing in advance discrimination information, attribute information and information which limits the image reader, corresponding to image data.

In FIG. 8, the three image forming devices 181 to 183 are connected. However, the number of image forming devices is not limited to three, but may be two, or four or more.

Third Embodiment

In the first and second embodiments, the image transfer path is assumed to comprise a special-purpose data line, but may comprise a public circuit such as an ISDN or telephone circuit.

FIG. 9 is a block diagram showing a schematic arrangement of a copying system according to the third embodiment of the present invention.

In the third embodiment, as shown in FIG. 9, an image processing apparatus comprising an image reader 101, an image processor 105, and the like is connected to an image forming device 191 and an output storage device 192 via a public circuit 190.

In this embodiment, in consideration of not only a case wherein the image processing apparatus reads color image data, but also a case wherein color image data from the image reader 101 is directly transmitted through a communication path 102, a transmission prohibition attribute is determined for each of apparatuses as communication destinations, and the color image to be transmitted, is limited by recognition of the attribute.

Fourth Embodiment

In the first to third embodiments described above, the copy limit attribute is determined by owner or by apparatus independently of color images. Alternatively, copy limit attributes for specific color images may be prestored in an image reader 101, and when these color images are read by the image reader 101, the copy limit attributes for the images may be automatically determined.

Note that the present invention can be applied to either a system comprising a plurality of devices or an apparatus comprising a single device. It is needless to say that the present invention can be applied to a case which can be attained by supplying programs which execute the process defined by the present system or invention.

The present invention can be applied to a laser beam printer, an ink-jet printer, and a thermal printer as a color copying machine (image forming device). In particular, the present invention can be applied to a bubble-jet type printer which uses a head of a type for ejecting ink droplets by utilizing film boiling caused by heat energy.

In each of the above embodiments, an original image is input by the image reader. However, the present invention is not limited to this. For example, an image input from a still video camera or a video camera, or an image created by computer graphics may be used.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   first input means for inputting predetermined identification information;
   means for inputting attribute information for indicating a limitation of an output operation of image data;
   storage means for storing input image data, the identification information, and the attribute information in correspondence with each other;
   second input means for newly inputting identification information; and
   control means for controlling the output operation of the image data in accordance with the attribute information, if the newly input identification information is not the predetermined identification information.

2. The apparatus according to claim 1, wherein the identification information comprises information for identifying a user of an apparatus.

3. The apparatus according to claim 1, wherein the identification information comprises information for identifying an apparatus.

4. The apparatus according to claim 1, further comprising selection means for selecting, as the attribute information, one of a plurality of pieces of information prepared in advance.

5. The apparatus according to claim 4, wherein the image data is color image data, and the plurality of pieces of information include information for prohibiting a copy operation of the color image data, information for inhibiting a color copy operation of the color image data, and information for enabling a copy operation of the color image data.

6. The apparatus according to claim 5, wherein when said selection means selects the information for prohibiting the color copy operation of the color image data, said data output means outputs a color image as a monochrome image.

7. An image processing apparatus comprising:
   a plurality of image copying means for copying input image data;
   means for inputting first identification information for identifying said plurality of image copying means;
   selection means for selecting one of a plurality of pieces of attribute information indicating a copy limit of the image data, which are prepared in advance;
   storage means for storing input image data, the first identification information, and the attribute information in correspondence with each other;
   comparing means for comparing newly input identification information with the first identification information stored in said storage means; and
   data output means for controlling an output operation of the image data from each of said plurality of image copying means according to a comparison result and the attribute information.

8. The apparatus according to claim 7, wherein the image data comprises color image data, and the attribute information includes information for prohibiting a copy operation of the color image data, information for inhibiting a color copy operation of the color image data, and information for enabling a copy operation of the color image data.

9. The apparatus according to claim 8, wherein when said selection means selects the information for prohibiting the color copy operation of the color image data, said data output means outputs a color image as a monochrome image.

10. The apparatus according to claim 7, wherein the attribute information is stored in an input unit of the image data, and said selection means selects the attribute information when the image data is input.

11. The apparatus according to claim 7, further comprising input means for inputting second identification information for identifying other than said plurality of image copying means, wherein said storage means stores the input image data, said first identification information, the attribute information and said second identification information in correspondence with each other; said comparing means compares newly input identification information with said second identification information stored in said storage means; and said data output means controls an output operation of the image data from each of said plurality of image copying means according to a comparison result.

12. An image processing apparatus for reproducing stored image data which is stored correspondingly with predetermined identification information and attribute information for indicating an output limitation of the image data, comprising:

first input means for inputting predetermined identification information;

means for inputting attribute information for indicating a limitation of an output operation of image data;

storage means for storing input image data, the identification information, and the attribute information in correspondence with each other;

second input means for newly inputting identification information; and control means for controlling the output operation of the image data in accordance with the attribute information, if the newly input identification information is not the predetermined identification information.

13. The apparatus according to claim 12, wherein the identification information comprises information for identifying a user of an apparatus.

14. The apparatus according to claim 12, wherein the identification information comprises information for identifying an apparatus.

15. The apparatus according to claim 12, further comprising selection means for selecting, as the attribute information, one of a plurality of pieces of information prepared in advance.

16. The apparatus according to claim 15, wherein the image data comprises color image data, and the plurality of pieces of information include information for prohibiting a copy operation of the color image data, information for inhibiting a color copy operation of the color image data, and information for enabling a copy operation of the color image data.

17. The apparatus according to claim 16, wherein when said selection means selects the information for prohibiting the color copy operation of the color image data, said data output means outputs a color image as a monochrome image.

18. A color image processing apparatus for reproducing first format image data stored in storage means, said apparatus comprising:

first output means for reproducing a first format image corresponding to the first format image data from the storage means; and second output means for converting the first format image data stored in the storage means into second format image data and for reproducing a second format image corresponding to said second format image data, wherein, when performing an output operation, one of said first output means and said second output means is selected for reproducing image data, in accordance with whether or not a user who has given an instruction of an output is a specified user.

19. The apparatus according to claim 18, wherein the first format image data is color image data.

20. The apparatus according to claim 18, wherein the second format image data is monochrome image data.

21. A color image processing apparatus for reproducing first format image data stored in storage means, said apparatus comprising:

first output means for reproducing a first format image corresponding to the first format image data from the storage means; and second output means for converting the first format image data stored in the storage means into second format image data and for reproducing a second format image corresponding to said second format image data, wherein, when performing an output operation, said first and second output means are selectively changed over for each of the reproduced image data, in accordance with whether or not an input user identification indicates a specified user.

22. The apparatus according to claim 21, wherein the first format image data is color image data.

23. The apparatus according to claim 21, wherein the second format image data is monochrome image data.

24. An image processing method comprising:

a first input step of inputting predetermined identification information;

a step of inputting attribute information for indicating a limitation of an output operation of image data;

a step of storing input image data, the identification information, and the attribute information in correspondence with each other;

a second input step of newly inputting identification information; and a step of controlling the output operation of the image data in accordance with the attribute information, if the newly input identification information is not the predetermined identification information.

25. An image processing method of reproducing stored image data which is stored correspondingly with predetermined identification information and attribute information for indicating an output limitation of the image data, comprising:

a first input step of inputting predetermined identification information;

a step of inputting attribute information for indicating a limitation of an output operation of image data;

a step of storing input image data, the identification information, and the attribute information in correspondence with each other;

a second input step of newly inputting identification information; and a step of controlling the output operation of the image data in accordance with the attribute information, if the newly input identification information is not the predetermined identification information.

26. A color image processing method of reproducing first format image data stored in storage means, comprising:

a first output step of reproducing a first format image corresponding to the first format image data from the storage means; and a second output step of converting the first format image data stored in the storage means into second format image data and of reproducing a second format image corresponding to the second format image data, wherein, when performing an output operation, one of said first output step and said second output step is selected for reproducing image data, in accordance with whether or not a user who has given an instruction of an output is a specified user.

27. A color image processing method of reproducing first format image data stored in storage means, comprising:

a first output step of reproducing a first format image corresponding to the first format image data from the storage means; and a second output step of converting the first format image data stored in the storage means into second format image data and of reproducing a second format image corresponding to the second format image data, wherein, when performing an output operation, said first and said second output steps are selectively changed over for each of the reproduced image data, in accordance with whether or not an input user identification indicates a specified user.

28. A computer program product comprising a computer usable medium having computer readable program code means embodied therein for processing an image, comprising:

first computer readable program code means for causing a computer to input predetermined identification information;

second computer readable program code means for causing the computer to input attribute information for indicating a limitation of an output operation of image data;

third computer readable program code means for causing the computer to store input image data, the identification information, and the attribute information in correspondence with each other;

fourth computer readable program code means for causing the computer to newly input identification information; and fifth computer readable program code means for causing the computer to control the output operation of the image data in accordance with the attribute information, if the newly input identification information is not the predetermined identification information.

29. A computer program product comprising a computer usable medium having computer readable program code means embodied therein for reproducing stored image data which is stored correspondingly with predetermined identification information and attribute information for indicating an output limitation of the image data, comprising:

first computer readable program code means for causing a computer to input predetermined identification information;

second computer readable program code means for causing a computer to input attribute information for indicating a limitation of an output operation of image data;

third computer readable program code means for causing a computer to store input image data, the identification information, and the attribute information in correspondence with each other;

fourth computer readable program code means for causing a computer to newly input identification information; and fifth computer readable program code means for causing a computer to control the output operation of the image data in accordance with the attribute information, if the newly input identification information is not the predetermined identification information.

30. A computer program product comprising a computer usable medium having computer readable program code means embodied therein for reproducing a first format image data stored in storage means, comprising:

first computer readable program code means for causing a computer to reproduce a first format image corresponding to the first format image data from the storage means;

second computer readable program code means for causing a computer to convert the first format image data stored in the storage means into second format image data and to reproduce a second format image corresponding to the second format image data; and third computer readable program code means for causing a computer, when performing an output operation, to select one of the first and second computer readable program code means for reproducing image data, in accordance with whether or not a user who has given an instruction for an output is a specified user.

31. A computer program product comprising a computer usable medium having computer readable program code means embodied therein for reproducing first format image data stored in storage means, comprising:

first computer readable program code means for causing a computer to reproduce a first format image corresponding to the first format image data from the storage means;

second computer readable program code means for causing a computer to convert the first format image data stored in the storage means into second format image data and to reproduce a second format image corresponding to the second format image data; and third computer readable program code means for causing a computer, when performing an output operation, to selectively change over the first and second computer readable program code means for each of the reproduced image data, in accordance with whether or not an input user identification indicates a specified user.

* * * * *

UNITED STATES PATENT AND TRADEMARK OFFICE
CERTIFICATE OF CORRECTION

PATENT NO. : 5,640,253
DATED : June 17, 1997
INVENTOR(S) : YOSHIKI UCHIDA, ET AL.

It is certified that error appears in the above-identified patent and that said Letters Patent is hereby corrected as shown below:

ABSTRACT
[57]
Line 7, "etc.)" should read --etc.).--.

COLUMN 1
Line 20, "involve" should read --involves--.

COLUMN 4
Line 19, "date," should read --data--.
Line 26, "copying," should read --on copying--.

Signed and Sealed this

Sixth Day of January, 1998

Attest:

BRUCE LEHMAN

Attesting Officer

Commissioner of Patents and Trademarks